United States Patent
Olafsson

(10) Patent No.: US 9,476,756 B2
(45) Date of Patent: Oct. 25, 2016

(54) WEIGHING SYSTEM FOR DYNAMICALLY WEIGHING A FLOW OF ITEMS WITH TWO CONSECUTIVE FLAT WEIGHING SECTIONS ASSOCIATED WITH A FIRST SUPPORT FOR ALIGNING ADJACENT ENDS OF THE SECTIONS IN THE SAME PLANE AND A SECOND SUPPORT TO CREATE A ZERO WEIGHING SENSITIVITY AT THE DISTAL ENDS

(71) Applicant: Marel Iceland Ehf, Gardabaer (IS)

(72) Inventor: Jon Thor Olafsson, Gardabaer (IS)

(73) Assignee: MAREL ICELAND EHF, Gardabaer (IS)

( * ) Notice: Subject to any disclaimer, the term of this patent is extended or adjusted under 35 U.S.C. 154(b) by 41 days.

(21) Appl. No.: 14/381,139

(22) PCT Filed: Mar. 8, 2013

(86) PCT No.: PCT/EP2013/054775
§ 371 (c)(1),
(2) Date: Aug. 26, 2014

(87) PCT Pub. No.: WO2013/132078
PCT Pub. Date: Sep. 12, 2013

(65) Prior Publication Data
US 2015/0041226 A1 Feb. 12, 2015

Related U.S. Application Data

(60) Provisional application No. 61/624,604, filed on Apr. 16, 2012.

(30) Foreign Application Priority Data

Mar. 8, 2012 (EP) .................................... 12001609

(51) Int. Cl.
*G01G 11/00* (2006.01)
*G01G 21/23* (2006.01)
(Continued)

(52) U.S. Cl.
CPC ........... *G01G 11/003* (2013.01); *G01G 19/414* (2013.01); *G01G 21/23* (2013.01); *G01G 11/16* (2013.01)

(58) Field of Classification Search
CPC .... G01G 21/23; G01G 21/24; G01G 11/003; G01G 11/16; G01G 19/414
USPC ................................... 177/16, 145
See application file for complete search history.

(56) References Cited

U.S. PATENT DOCUMENTS 3,743,039 A * 7/1973 Vogt ....................... G01G 21/08
177/16
4,418,773 A * 12/1983 Finet ...................... G01G 23/01
177/16
(Continued)

FOREIGN PATENT DOCUMENTS

GB 1584981 2/1981

OTHER PUBLICATIONS

Extended European Search Report; Date: Aug. 24, 2012; Applicant: Marcel Iceland EHF; Application No. EP 12 00 1609; Place of Search: The Hague; Date of Completion of Search: Aug. 13, 2012.
(Continued)

*Primary Examiner* — Randy W Gibson
(74) *Attorney, Agent, or Firm* — Pearne & Gordon LLP

(57) ABSTRACT

This invention relates to a weighing platform and a weighing system including such a weighing platform for dynamically weighing a flow of items while being conveyed over the weighing platform. The weighing platform includes one or more load sensors used in conjunction with two or more flat weighing sections adapted to be placed on the load sensors. A first support connects the adjacent ends of the two or more flat weighing sections so as to form a continuous 2-dimensional planar surface there between. A second support maintains the distal ends of the two or more weighing sections, when connected together via the first support, at fixed height so as to create a zero weighing sensitivity at the distal ends.

15 Claims, 7 Drawing Sheets

(51) Int. Cl.
*G01G 19/414* (2006.01)
*G01G 11/16* (2006.01)

(56) References Cited

U.S. PATENT DOCUMENTS

| | | | | |
|---|---|---|---|---|
| 4,437,561 A | * | 3/1984 | Hasegawa | G01G 11/003 177/145 |
| 4,912,972 A | * | 4/1990 | Gregersen | B65H 61/00 177/200 |
| 5,304,745 A | * | 4/1994 | Rusk | B07C 5/16 177/128 |
| 5,635,679 A | * | 6/1997 | Kohashi | G01G 19/035 177/1 |
| 5,877,456 A | | 3/1999 | Homer, III et al. | |
| 5,990,422 A | * | 11/1999 | Komori | G01G 19/035 177/119 |
| 2003/0056995 A1 | | 3/2003 | Johnson | |
| 2014/0332288 A1 | * | 11/2014 | Hyer | G01G 3/12 177/1 |

OTHER PUBLICATIONS

PCT International Search Report; International Filing Date: Mar. 3, 2013; Applicant: Marcel Iceland EHF; Date of Actual Completion of International Search: May 10, 2013; Date of Mailing of International Search Report: May 22, 2013.

\* cited by examiner

WEIGHING SYSTEM FOR DYNAMICALLY WEIGHING A FLOW OF ITEMS WITH TWO CONSECUTIVE FLAT WEIGHING SECTIONS ASSOCIATED WITH A FIRST SUPPORT FOR ALIGNING ADJACENT ENDS OF THE SECTIONS IN THE SAME PLANE AND A SECOND SUPPORT TO CREATE A ZERO WEIGHING SENSITIVITY AT THE DISTAL ENDS

CROSS-REFERENCES TO RELATED APPLICATIONS

This application is the national phase of International Application No. PCT/EP2013/054775 filed on Mar. 8, 2013, which claims the benefit of priority to European Patent Application No. EP12001609.2 filed on Mar. 8, 2012 and U.S. Patent Application No. 61/624,604 filed on Apr. 16, 2012. The entire disclosures thereof are incorporated herein by reference.

FIELD OF THE INVENTION

The present invention relates to a weighing platform and a weighing system including such a weighing platform and an associated transport belt for dynamically weighing items such as food items.

BACKGROUND OF THE INVENTION

Weighing platforms that can dynamically weigh food items while being conveyed is becoming a standard component in food processing systems. The food industry needs to be able to weigh individual pieces of food as well as batches weighing thousands of kilos. An example of batch weighing is when a fishing vessel is e.g. selling 100 tons fish to a processing factory. Inside the processing factory it is common to weigh individual fishes or pieces of fish that enter various food processing systems for different reasons such as to determine the total input weight, tracking, forming end user packages and so on.

It is convenient to use flow scales for weighing big batches of food. Flow scales add up every piece of food that is moved over them and display the result as total kilo or lbs. Flow scales are typically formed by placing a load sensing device with some form of platform under a belt that carries the items to be weighed. Such flow scales could become a standard component in food processing systems.

FIG. 1a-c depicts schematically the principle of a prior art flow scales for dynamically weighing items, e.g. food items. As depicted here, an in-feed conveyor 101 conveys a food item 104 to a flow scale 102 that comprises a weighing platform with an associated closed loop conveyor belt on the top that conveys the item over the weighing platform while registering weighing-related signal. A take-away conveyor 103 is situated adjacent to the flow scale for receiving and conveying the weighed food item for further processing. Since a single item is being weighed at a time, i.e. one item is located on the weighing platform 102 at a time, the distance between adjacent food items must be at least as much as the length of the platform 102.

Many of the food approved platforms are made of plastic material and are prone to deform, where this deformation becomes larger the larger the platform is. All such deviations from the original shape of the weighing platform will affect the weighing accuracy. Referring to FIG. 1a-c, height differences that may occur at the in-feed and out-feed ends between the weighing platform 102 and the conveyors 101, 103 will affect the weighing accuracy because the force on the load receiver 105 will change according to the torque needed to run the belt on top of the load receiver 105. Also, when the food item enters the weighing platform (see FIG. 1b) it is pushed somewhat downward as indicated by the arrows, as well as when the food item leaves the weighing platform to the take-away conveyor (see FIG. 1c), but such a tilting affects the weighing accuracy. It is of outmost importance that the belt that is used for such flow scales is very flexible in the vertical direction since otherwise the load sensor will not sense all the weight of the material and an error will be introduced.

Other type of flow scales that are frequently used in the industry for weighing continuous flow of items are flow scales such as the one shown in FIG. 2 comprising four wedge shaped rollers 301, two rollers acting as weighing rollers 304, 305 and two rollers acting as fixed rollers 302, 303 at the opposite ends, where rubber/vinyl belt (not shown) is typically used to hold the material that is being weighed. Such U-shaped flow scales are well known in industries where accuracy is not important and where large amount of material is being weighed over a relative long time. The U-shaped belt that is used is not flexible and to counteract that drawback it is common to increase the length of the weighing section to several meters and use more load sensing devices. For weighing platforms of this kind, it is of outmost importance that the rollers are at the same height and that the stiffness of the belt remains fixed at all times. Also, the stiffness of the belt varies with temperature fluctuations and may thus easily affect the measuring results.

GB 1 584 981 discloses a U-shaped flow scale similar as depicted in FIG. 2 but further comprising U-shaped continuous plate structures forming a support for the conveyor belt, where a pair of first supports for the belt are spaced apart in the direction of the length of the belt and at least one second support for the belt is positioned there between, where the second support is associated with weigh means. This apparatus is especially suitable for weighing uniform material such as sand, gravel etc. due to the U-shape surface of the supports (preventing it from flowing from the sides). The consequences of using supports having such U-shape is that carrying capacity is created in the belt lying on top on the U-shaped supports creating an upwardly extending vertical force, but this force affects the weighing accuracy greatly. Because of this, such weighing apparatuses having such U-shaped forms are relative long, typically several meters, so as to reduce the carrying capacity effect of the U-shaped belt, i.e. the longer the U-shaped belt is the less will the stiffness in the belt be and thus the less will the upwardly extending vertical force be. This U-shaped flow scales are thus very spacious.

Moreover, the carrying capacity in the belt due to the U-shape will change when external conditions such as the temperature change. An increase in the temperature will make the belt softer which consequently magnifies the weighing signal because the belt has more tendencies to lie on the U-shape support, i.e. the load cell, and vice versa, a decrease in the temperature will make the belt more stiff and thus increases the upwardly extending vertical force having the opposite effect on the weighing signal.

Also, any kinds of deformation in the supports due to change of external conditions such as thermal fluctuation such as twisting will affect the weighing accuracy but any misfits that are formed due to such deformation between the second and first supports cause that incoming load may either partly hit the second support or partly fall onto the second support, but such extra impacts cause an error in the weighing accuracy. Moreover, since the supports are solid structures external conditions such as draught may further affect the weighing accuracy of the weighing apparatus in GB 1 584 981.

The inventor of the present invention has appreciated that there is thus a need for an improved weighing platform that is capable of measuring a flow of items, where the above mentioned uncertainty in measuring is reduced and has in consequence devised the present invention.

SUMMARY OF THE INVENTION

It would be advantageous to achieve an improved weighing platform that is capable of dynamically weighing a flow of items with high accuracy. In general, the invention preferably seeks to mitigate, alleviate or eliminate one or more of the above mentioned disadvantages singly or in any combination. In particular, it may be seen as an object of the present invention to provide a weighing platform that solves the above mentioned problems, or other problems, of the prior art.

To better address one or more of these concerns, in a first aspect of the invention a weighing platform is provided adapted to be used in a weighing system for dynamically weighing a flow of items such as food items, the weighing platform comprising:
  at least one load sensor,
  at least two flat weighing sections adapted to be placed on said at least one load sensor,
  first supporting means for connecting or supporting said at least two flat weighing sections such that adjacent ends of said at least two flat weighing sections are aligned within the same plane such that said two flat weighing sections form a 2-dimensional planar surface, and
  second supporting means for maintaining distal ends of said at least two flat weighing sections, when connected or supported via said first supporting means, at fixed height so as to create a zero weighing sensitivity at said distal ends.

By the term flow of items may according to the present invention be understood as continuous or semi continuous flow of multiple of items that form a continuous or substantially continuous flow of items that are being weighed at the same time. The term flow of items may also be understood as a "short continuous" flow meaning a flow of a single items where only one item is being weighed at a time, i.e. one item is present on the platform at a time while being conveyed.

The opposite ends of the weighing platform are very critical measuring points and create the most uncertainty in the weigh measuring. It is namely at these ends where bending/tilting of the weighing platform may easily occur when the items enter/leave the weighing platform, causing it to be pushed somewhat downward/upward, but this magnifies the uncertainty in the weight measurement. It is also at these opposite ends where thermal changes of the weighing platform are likely to occur, which also become visible in the uncertainty. Therefore, by setting the weighing sensitivity at these opposite ends down to zero the quality of the overall measuring data over the measuring period has better stability. The measuring will thus be more reliable and the weighing repeatability will be better.

Moreover, by utilizing flat weighing section forming said two dimensional (2D) planar surface, the length of the weighing platform may be shortened greatly compared to the prior art U-shaped weighing platforms. Such prior art U-shaped platforms are typically several meters so as to reduce the carrying capacity effect of the U-shaped belt that is typically implemented. As an example, according to US-legislation (handbook 44) the length of such prior art platforms is typically 18 feet because otherwise the U-shaped conveyor belt that is used has too much stiffness that affects the weighing accuracy so that it becomes too low. This means obviously that such U-shaped weighing platforms are very spacious.

Accordingly, the advantage of utilizing such 2D planar platform, the length of it is scalable up and down and can e.g. be few cm long or even shorter. This is because the carrying capacity that is otherwise created in said U-shaped conveyor belts is eliminated due to the 2D planar surface form of the flat weighing sections. This means that when one item is being weighed at a time the distance between adjacent items can be reduced significantly compared to said U-shaped prior art platforms which increases the throughput, i.e. number of discrete items per minute.

Any types of load sensors well known in the art may be used, e.g. beam load cell, shear beam load cells or a single point load cell. The load sensor may also according to the present invention be interpreted as any kind of a force sensor.

The length of the individual weighing sections may as an example be 0.5 meters or shorter, e.g. 20 cm.

In one embodiment, said at least two weighing sections comprise multiple of elongated beams arranged parallel to the conveying direction of said items.

In another embodiment, said at least two weighing sections comprise multiple of elongated beams arranged parallel to the conveying direction of said items, wherein at said adjacent ends of the at least two weighing sections the ends of the beams interleave or interlace at least partly.

Accordingly, a light weight weighing platform is provided that provides a smooth surface where external conditions such as draught affect the weighing accuracy much less compared to if the platform would be made of a single solid structure, and at the same time provides the necessary form stability.

Also, in case the beams overlap partly at said adjacent ends it is ensured that the wearing of the conveyor belt is more even which increases the lifetime of the conveyor belt.

Further, in case a part of the material in the platform is somewhat defected, e.g. a single elongated beam bends due to any reason, it will not deform the whole platform. Such a beam may thus easily be replaced with a new one which e.g. reduces the maintenance cost.

In addition to this, the fact that the adjacent ends of the beams either interleave or if there is some distance between the adjacent ends of the beams such as several millimeters or centimeters, all thermal expansions in the elongated beams will occur at said adjacent ends, i.e. be absorbed at the adjacent ends and not at said second supporting means. This means that the total length of the weighing platform will remain fixed at all times and thus the readout of the weighing platform becomes constant and independent of temperature changes.

Moreover, in case adjacent ends of said elongated beams interleave at least partly no gap is created between the at least two weighing sections, that could otherwise affect the weighing accuracy, especially when the conveyor belt being implemented is e.g. a very deformable conveyor belt such as plastic modular belt system made of a multiple of module units internally connected via hinge system.

Also, warping effects are greatly reduced since the platform is divided into many partly independent beams. This will ensure more planar platform in normal operating position resulting in better accuracy.

In one embodiment, the weighing apparatus further comprises additional flat in-feed or flat out-feed section with zero weighing sensitivity acting as an extension to one of said distal ends of said at least two flat weighing sections, the additional flat in-feed or flat out-feed section being connected or supported by said second supporting means in a way that the additional flat in-feed or flat out-feed section is aligned within the same two-dimensional plane as said at least two flat weighing sections. In another embodiment, the weighing apparatus further comprises additional flat in-feed and flat out-feed sections with zero weighing sensitivity acting as extensions to the distal ends of said at least two flat weighing sections, the additional flat in-feed and flat out-feed sections being supported by said second supporting means in a way that the additional flat in-feed and flat out-feed sections are aligned within the same plane as said at least two flat weighing sections. It is thus ensured that the incoming items will run smoothly at constant speed over the weighing platform and all undesired impacts when the items go from the in-feed conveyor to the weighing platform and/or from the weighing platform to the take-away conveyor will be absorbed by the in-feed and/or the out-feed sections.

In one embodiment, said first supporting means is a supporting plate structure extending across the weighing platform, where the adjacent ends of said at least two flat weighing sections rest on the upper end of said supporting plate structure. In another embodiment, said first supporting means comprises an elongated rod that extends through said portions of the beams that interleave or interlace at least partly and mounts the adjacent first and second weighing sections together in a hinge like manner.

In one embodiment, said lower end of said supporting plate structure rests on said at least one load sensor. It is thus ensured that the weighing sensitivity will be highest where said at least first and second weighing sections meet.

In one embodiment, the upper end of said supporting plate structure comprises a cut-out pattern forming a plurality of recesses for engaging with the elongated beams at the adjacent ends. It is thus ensured that said elongated beams will be maintained in a fixed position in relation to each other.

In one embodiment, the weighing platform comprises two flat weighing sections and where said at least one load sensor is positioned under said first supporting means. Thus, in case where the number of weighing sections is only two, the weighing-sensitivity curve will have inclining portion at the opposite ends of the curve where the weighing sensitivity is zero and increasing linearly up to a maximum value where the load sensor is located and from the maximum value linearly down to zero weighing sensitivity.

In another embodiment, the weighing platform comprises three or more flat weighing sections.

In a second aspect of the invention a weighing system is provided comprising said weighing platform, comprising:
- a closed loop conveyor belt extending over said weighing platform,
- a driving motor for driving said conveyor belt,
- a displacement registration mechanism for registering the positions of the items while being conveyed over the weighing platform, and
- a computer system operable connected to said displacement registration mechanism and said weighing platform for registering weight related signals from the at least one load sensor for different positions of said items on the weighing platform and calculating the weight of the items based on said weight related signals for said different positions.

In one embodiment, said conveyor belt is a modular belt system made of multiple of module units internally connected via hinge system. A very smooth and flexible conveyor belt is thus provided that minimizes the influence on the weighing. The length of the modules may, but is not limited to, between 10-50 mm. In praxis such belts are sold as ½ inch and ¾ inch and 1 inch long. Such modular belts may be made of any type e.g. plastic material or any type of metal or metal alloys or any other type of material. By utilizing such modular belts the speed of the belt may easily controlled and/or measured.

In one embodiment the belt is stiff transverse to the conveying direction but flexible in the longitudinal direction (parallel to the conveying direction), e.g. such as said modular belt.

In one embodiment, the calculation of the weight of the items is based on said weight related signals is based on applying integral calculation by means of integrating over the measuring period where the items enter the weighing platform until when the items leave the weighing platform.

In one embodiment, the weighing system is a dynamic weighing system adapted for weighing one item at a time.

In another embodiment, the weighing system is a dynamic weighing system adapted for weighing a continuous flow of items.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1A:
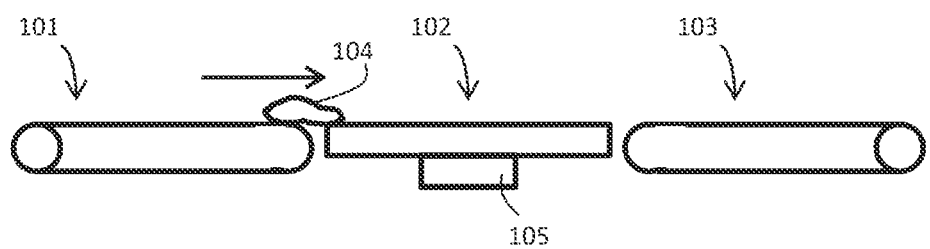
FIG. 1a-c depicts schematically a prior art weighing platform for dynamically weighing food items while being conveyed.
Figure 1B:
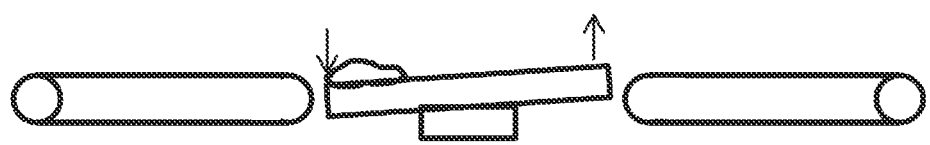
Figure 1C:
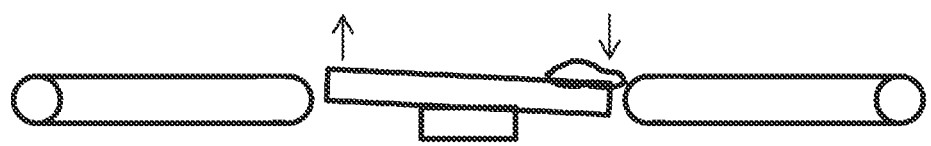
Figure 2:
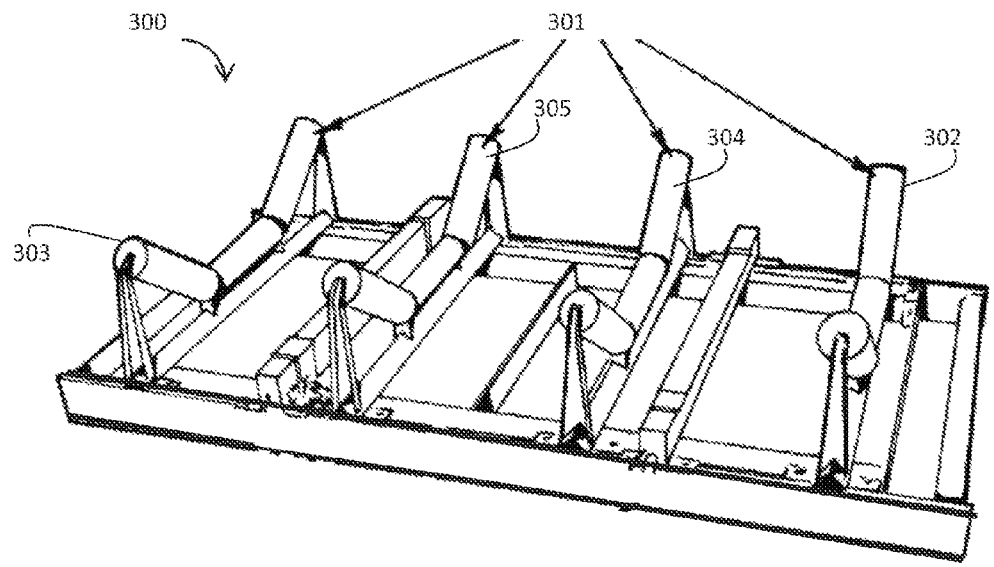
FIG. 2 shows a prior art flow weigher for automatic weighing of a continuous flow of a bulk product comprising four wedge shaped rollers.
Figure 3:
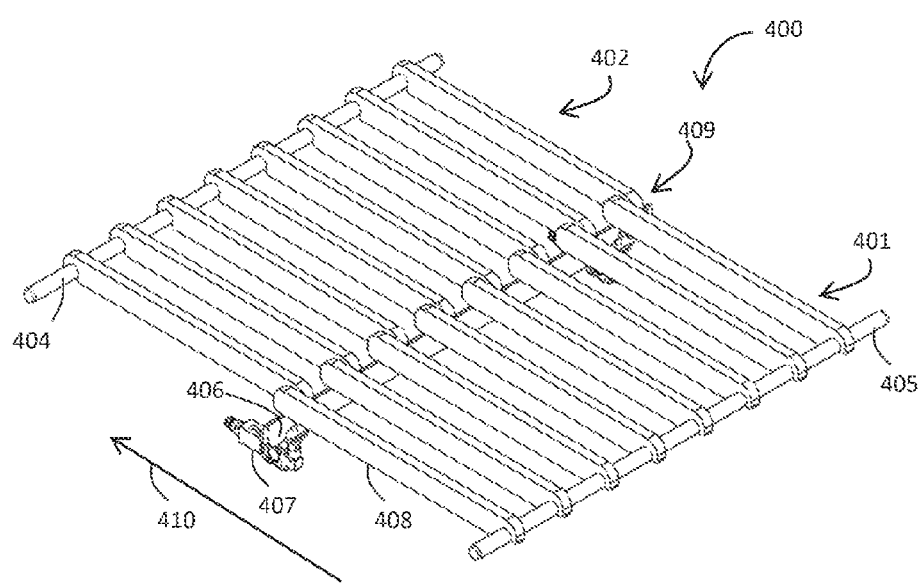
FIG. 3 shows an embodiment of a weighing platform according to the present invention for dynamically weighing items, FIG. 4 that shows a triangular shaped weight-sensitivity-curve when the weighing platforms contains two weighing sections.

FIG. 3 shows an embodiment of a weighing platform 400 according to the present invention for dynamically weighing items, where the weighing platform comprises at least one load sensor 407, a first 401 and a second 402 flat weighing sections that rest on the load sensor 407, a first supporting means 406 and second supporting means 404 and 405. The items may be, but is not limited to, food items of all types such as meat, fish, poultry, pork etc. Also, the items may be separated item pieces where one item is being weighed at a time, or the items may be a continuous flow of items.

The first supporting means 406 connects the adjacent ends of the first 401 and the second 402 flat weighing sections together in a way that the weighing sections are aligned within the same plane such that said two flat weighing sections form a 2-dimensional planar surface, and preferably such that no height differences/misfits are formed at the interfaces where the two weighing section meet. In one embodiment, the weighing sections comprise a multiple of beams 408 aligned within the same plane and arranged parallel to the conveying direction of the items as indicated by the arrow 410. The adjacent ends 409 of the elongated beams of the first and the second weighing sections interleave at least partly. By doing so, all length variations due to e.g. temperature changes will be leveled out at these ends and the length of the weighing platform will remain fixed at all times. Also, by utilizing such beams in the weighing platforms instead of single plate structures external conditions such as draught affect will have much less influence. Also, the beams are easily replaceable so that if one beam is somehow defected, it may be replaced with a new one, whereas in case of a single solid weighing section, if it would partly be defected one would have to replace the whole weighing section with a new one.

It should be noted that the embodiment shown here should not be construed as being limited to elongated beams that interleave at least partly. There might just as well be a small interval of e.g. few millimeters or centimeters between the elongated beams of the adjacent weighing platforms 401, 402, i.e. a scenario where they do not at least partly interleave.

The beams are preferably made of food approved material such as, but not limited to, food approved plastic material. As depicted here the first supporting means is a supporting plate structure 406 arranged across the weighing platform and placed in upright position, where the first 401 and the second 402 flat weighing sections rest on the upper end of the supporting plate structure 406. As shown here, the lower end of the supporting plate structure 406 rests on the at least one load sensor 407, which in this embodiment consist of a set of beam load cells arranged at the opposite ends of the supporting plate 406 but other types of load sensor may just as well be used, e.g. a single beam load cell.

The second supporting means 405, 404 is used for maintaining the distal ends of the first 401 and the second flat weighing sections 402 at fixed height at all times. As an example, this supporting means may e.g. be a stainless steel beam or rod that is connected to an external support such as a frame structure (not shown here) associated with the weighing platform 400.

By maintaining the distal ends of the flat weighing sections at fixed height the weighing sensitivity at the distal ends is set down to zero.

The flow of items that is weighed by the weighing system according to the present invention may be a continuous or semi continuous flow of multiple of items that form a continuous or substantially continuous flow of items that are being weighed at the same time, or a "short continuous" flow of items, which may e.g. be weighing a single item at a time, where the length of the weighing platform may be shorter that the length of the item being weighed and where the measured weight related signal is integrated over time and converted into a weight value. Generally, when weighing one item at a time it is preferred that the item that is being weighed has left the weighing platform before the next items enters the weighing platform. Thus, it may be preferred, but in no way necessary, to use a shorter platform to help this issue because this weighing principle makes it possible to measure items that are longer than the platform. Short weighing plat form results in a faster single piece weighing, i.e. more pieces per minute.

Figure 4:
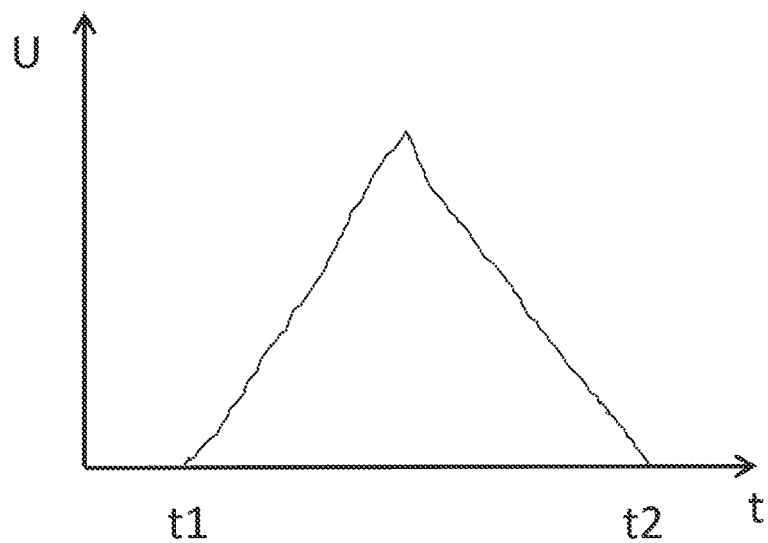

FIG. 4 depicts graphically an example of a weight sensitivity curve for a weighing platform comprising two weighing sections used in a dynamic weighing system for dynamically weighing a single item at a time. Time t1 is the time where the item enters the weighing platform and time t2 where the item leaves the weighing platform, but the weighing sensitivity at t1 and t2, respectively, is zero. The vertical axis is the weight related signal (U), which may also be interpreted as the weighing sensitivity. The shape of the weight related signal curve for the measuring period t1-t2 has a triangular shape since the number of weighing sections is two.

It should be noted that the number of flat weighing sections should not be construed as being limited to only two weighing sections as shown here. The number of flat weighing sections may just as well be three or more. In cases of e.g. three weighing sections, there may be a single load cell arrangement placed centrally under the middle weighing section, or two such load cell arrangements may also be provided at the interface between adjacent weighing sections. Also, the number of load sensors should not be construed as being limited to two load sensors, but a single load sensor or more than two load sensors may just as well be used. The load sensors may be placed at the center under the weighing platforms as shown in FIG. 3 (except when there are three or more weighing sections), or there may be further load sensors placed across the weighing platform, e.g. two or more first supporting means arranged across the weighing platform resting on one or more load sensors may also be provided.

Figure 5:
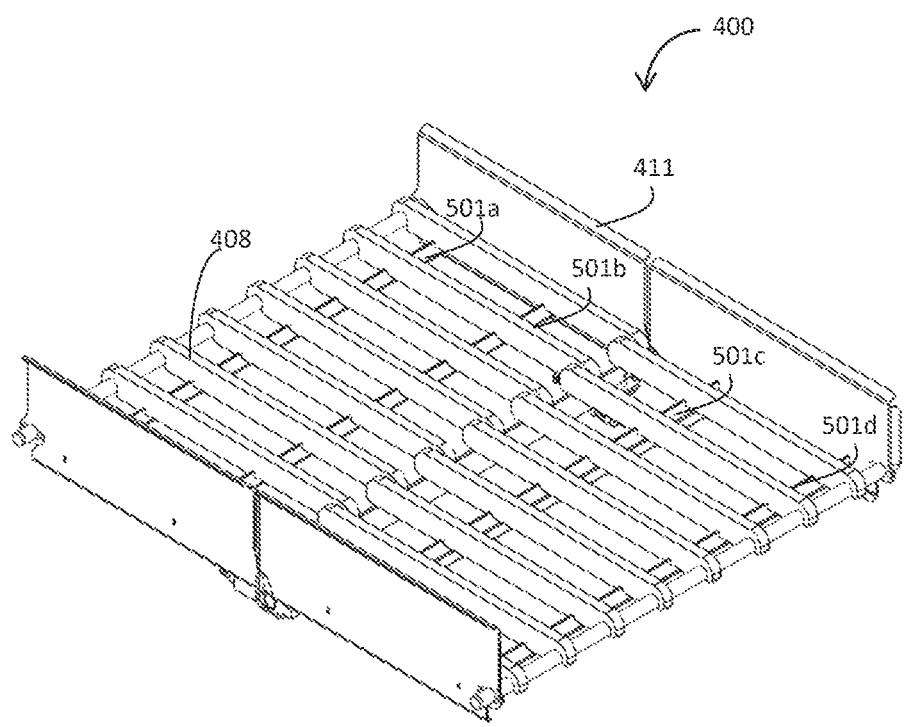
FIG. 5 depicts the weighing platform from FIG. 3 further comprising vertical side plate structures for guiding the food items.

FIG. 5 depicts the weighing platform from FIG. 3 further comprising vertical side plate structures 411 for guiding the food items, when weighing a continuous flow items so as to prevent the items from sliding sideways from the weighing platform. This plate structure 411 may further be utilized in maintaining the weighing platform 400 fixed together. FIG. 5 shows further, in addition to the embodiment in FIG. 3, crosswise arranged supporting plates 501a-d for providing an additional support for the multiple of beams 408. The plates may include a cut out pattern having substantially the same geometry as the cross section of the beams 408 such that the beams become propped therein.

Figure 6:
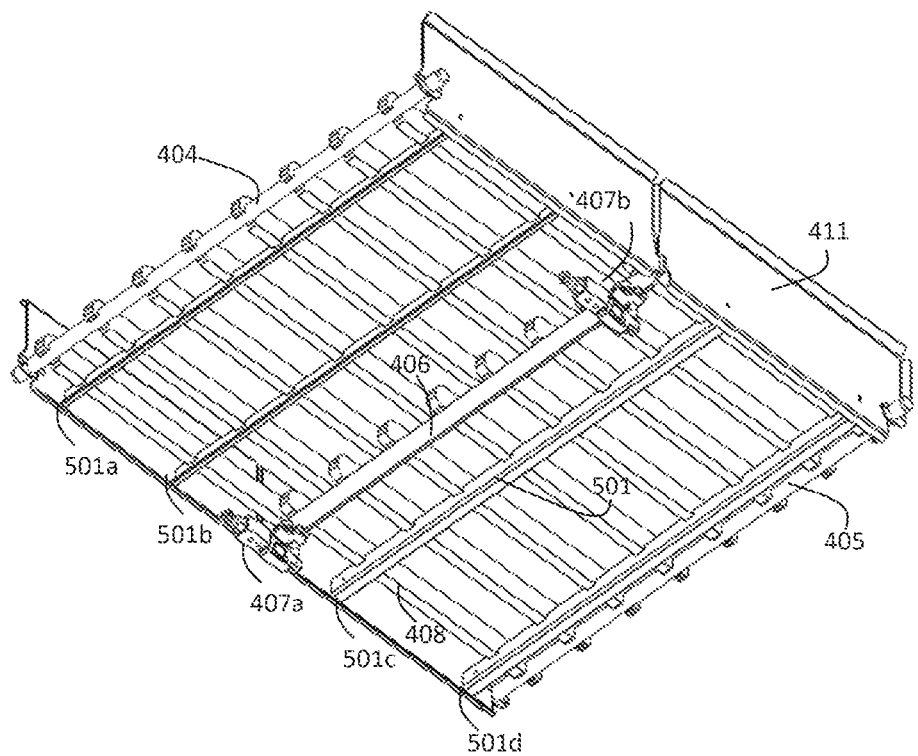
FIG. 6 shows the embodiment shown in FIG. 5 seen from below the weighing platform showing where the lower end of the supporting plate structure 406 rests on two load sensors arranged at the opposite ends of the supporting plate.

FIG. 6 shows the embodiment shown in FIG. 5 seen from below the weighing platform showing where the lower end of the supporting plate structure 406 rests on two load sensors 407a,b, arranged at the opposite ends of the supporting plate 406. The cut out pattern of the crosswise arranged supporting plates 501a-d is shown in more details for preventing any side wise displacement of the multiple of beams 408.

Figure 7:
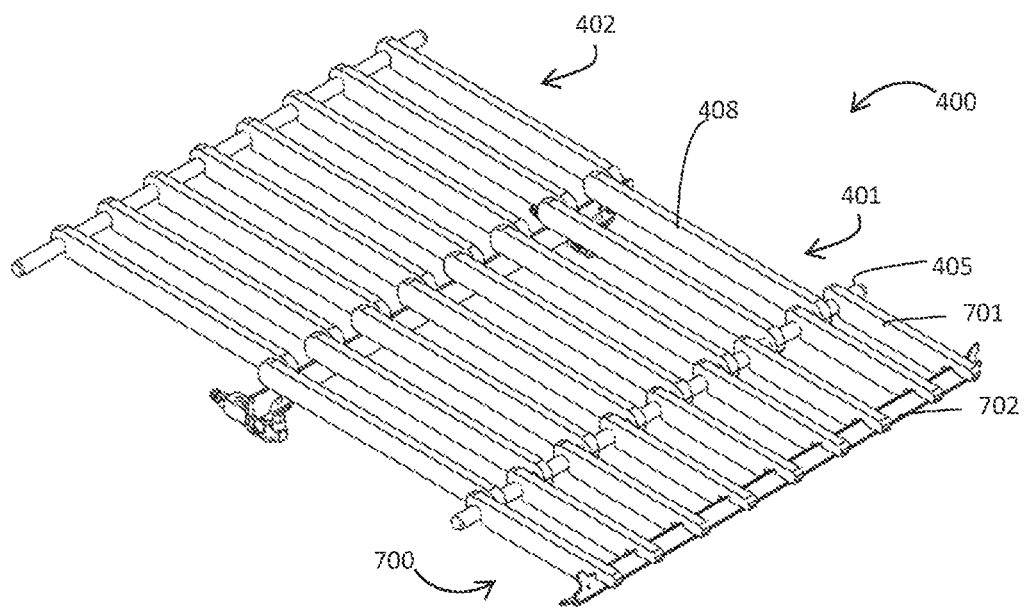
FIGS. 7 and 8 show the weighing platform depicted in FIG. 3 further comprising an additional in-feed or out-feed section with zero weighing sensitivity acting as an extension to the distal end of one of the second weighing sections with and without vertical side plate structures.
Figure 8:
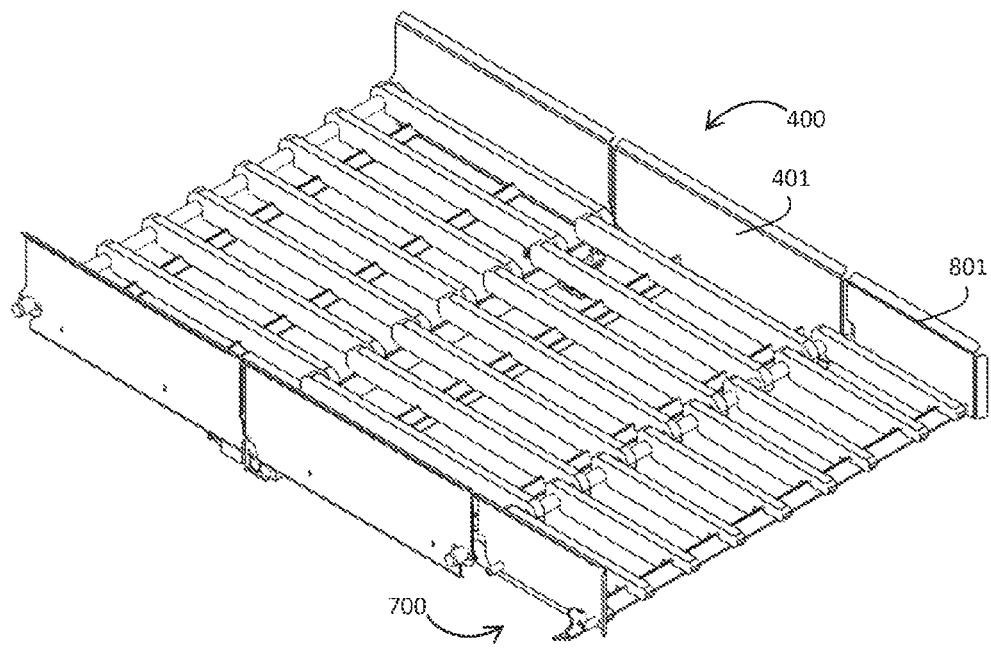

FIGS. 7 and 8 show the weighing platform 400 depicted in FIG. 3 further comprising an additional in-feed or out-feed section 700 with zero weighing sensitivity acting as an extension to the distal end of one of the second weighing sections 401, 402, with and without vertical side plat structures 401, 801. This additional section 700 is mounted to the supporting means 405 in a way that the multiple of beams 701 of the additional section 700 are parallel to the multiple of beams of the weighing sections and aligned within the same plane as multiple of beams 408. The distal end of this additional section may be mounted to an external support such as the frame structure 702 of the weighing platform. Assuming that this extension acts as an in-feed section for the weighing platform 400 and the weighing platform is implemented in a conveyor system (not shown here) the transfer from an in-feed conveyor (not shown) to the weighing platform 400 via the in-feed section 700 ensures that the transfer to the weighing platform 400 will always be smooth since all impacts that may occur at the interface between this adjacent conveyor and the in-feed section 700 will be absorbed by the in-feed section 700. Such impacts may e.g. be due to possible height differences between the conveyor and the in-feed section or because the item has certain stiffness so that it may falls abruptly onto the in-feed section.

At the boundary between the distal end of the weighing section 401 and the additional in-feed section 700 the multiple of beams 701, 408 are supported via the supporting means 405, which in this embodiment is an elongated rod, in a hinge like manner. As depicted here, the distal ends of the multiple of beams have U-shaped grooves of a diameter that is substantially the same as the diameter of the elongated rod 405.

Figure 9:
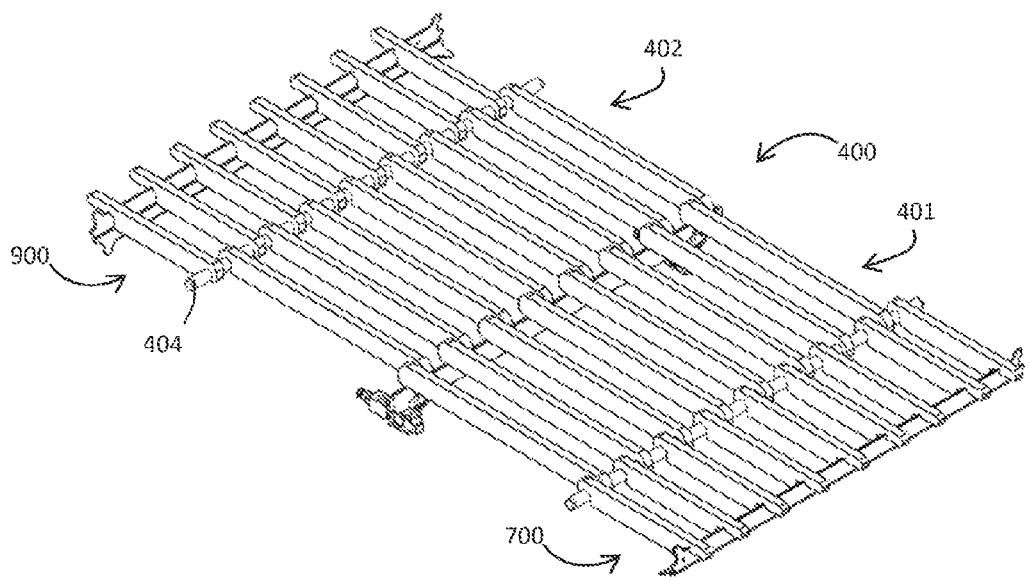
FIGS. 9 and 10 show the weighing platform depicted in FIG. 3 comprising, in addition to the additional in-feed section shown in FIGS. 7 and 8, an out-feed section with zero weighing sensitivity.
Figure 10:
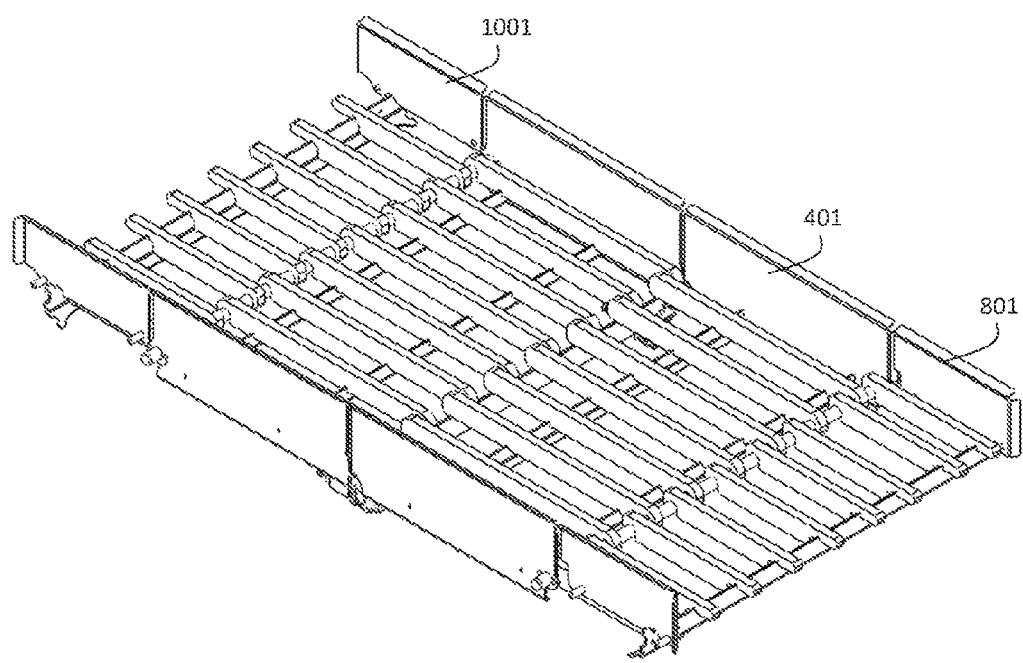

FIGS. 9 and 10 show the weighing platform 400 depicted in FIG. 3 comprising, in addition to the additional in-feed section 700 shown in FIGS. 7 and 8, an out-feed section 900 with zero weighing sensitivity. FIG. 10 shows the weighing platform with the side plate structures 401, 801 and an additional side plate structure for the out-feed section 1001. Accordingly, two additional sections 700, 900 sections are provided acting as in-feed and out-feed sections for the weighing platform 400. The out-feed section 900 may be mounted to the weighing section 402 similarly as the in-feed section 700, i.e. in a hinge like manner such that the multiple of elongated beams are aligned within the same planar surface. Accordingly, a smooth transfer of the item(s) being conveyed to and from the weighing platform is provided via these two sections where all possible misfits between the weighing platform 400 and adjacent conveyors (not shown) will be absorbed by these additional sections 700, 900.

In order to ensure that the two or more weighing sections, with or without the one or more additional sections 700, 900, are aligned accurately within the same plane, the weighing platform may further comprise at least one height adjusting mechanism (not shown) that allows height adjustments with part of millimeters or micrometers, preferably at all corners of the weighing platform. Further, to prevent a formation of bulge or valley like shape at the center where the first and the second weighing sections 401, 402 meet an additional height adjustment mechanism may be arranged between the two load sensors 407a,b to adjust the height level of the central part of the weighing platform 400.

Figure 11:
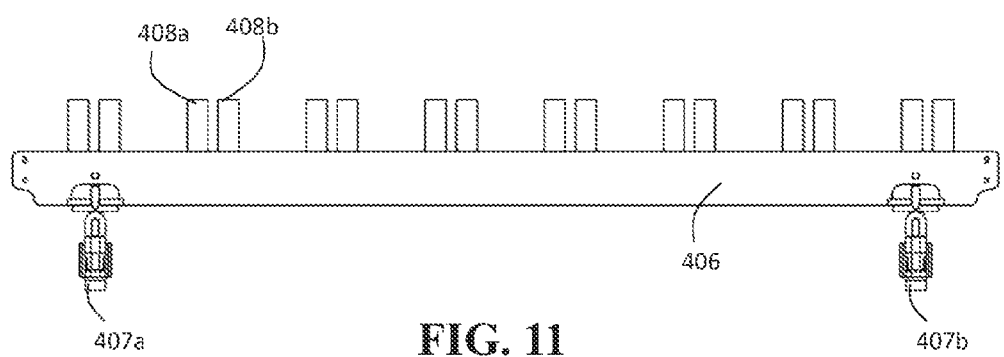
FIG. 11 shows a cross sectional view of the supporting plate structure depicted in FIG. 3.

FIG. 11 shows a cross sectional view of the supporting plate structure 406 depicted in FIG. 3. As shown here, the upper end that provides a support for the elongated beams 408a,b form a straight horizontal line, but the upper end may just as well comprises a cut-out pattern (not shown here) forming a plurality of recesses for engaging with the elongated beams 408a,b of the adjacent ends of the weighing platforms 401, 401.

Figure 12:
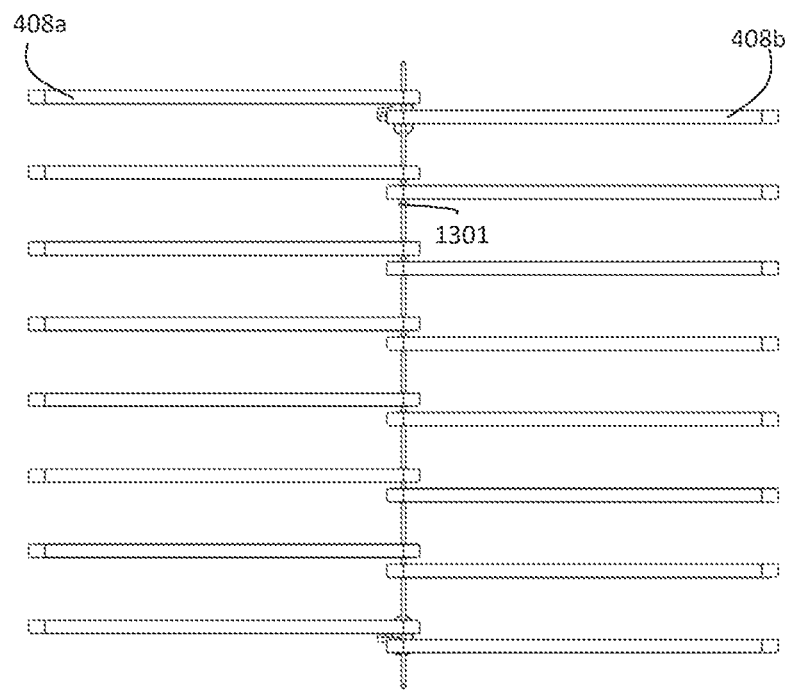
FIG. 12 shows a top view of another embodiment of a supporting plate structure where the elongated beams are supported or in a way mounted together via a rod extending through the overlapping portion of the elongated beams and FIG. 13 shows an embodiment of a weighing system according to the present invention comprising the weighing platform.

FIG. 12 shows a top view of another embodiment of a supporting plate structure where the elongated beams 408a,b are supported or in a way mounted together via a rod 1301 extending through the interleaving portion of the elongated beams 408a,b. Under the rod, a further support or an extension may be provided (not shown) that acts as an intermediate support between the rod and the load sensors 407a,b.

Figure 13:
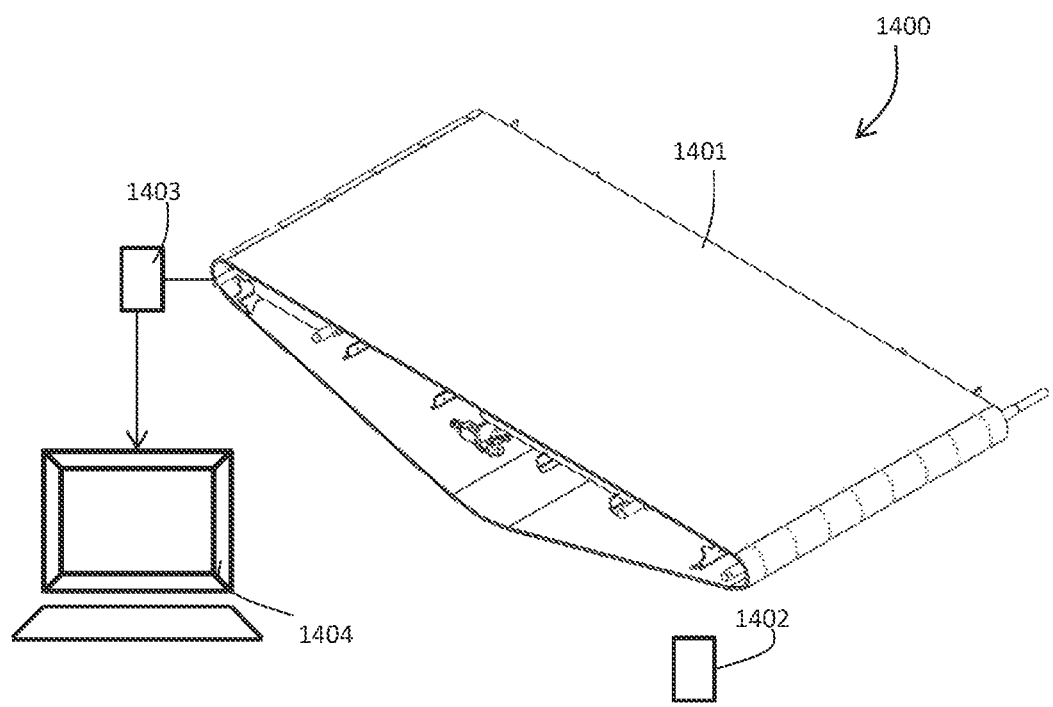

FIG. 13 shows an embodiment of a weighing system 1400 according to the present invention comprising the weighing platform 400, where the weighing platform 400 may be with or without one or both of the above mentioned in-feed and or out-feed sections 700, 900. As shown here, the system is shown in the absence of the sidewalls shown in FIGS. 6, 8 and 10, but such side walls would be preferred when weighing a continuous flow of items such as a continuous flow of small fishes such as capelin that would otherwise flow out of the sides of the weighing system.

The weighing system 1400 comprises a closed loop conveyor belt 1401 extending over the weighing platform 400 and a driving motor 1402 or a driving shaft for driving the conveyor belt 1401 so as to convey the items over the weighing platform 400. In one embodiment, the conveyor belt is a plastic modular belt system made of a multiple of module units internally connected via hinge system so as to provide a light weight conveyor belt that minimizes the impact of possible stress and/or strain in the conveyor belt due to various external conditions on the weighing accuracy.

The belt may either be pulled or be pushed by driving wheels at either ends or both ends, i.e. pushing and pulling the belt.

The weighing system 1400 further comprises a computer system 1404 operable connected to a displacement registration mechanism 1403 and the load sensor(s) 407 of the weighing platform 400 for registering a weight related signals for different positions of the items on the weighing platform, e.g. for every 5 mm. As an example, the displacement registration mechanism 1403 may be a tachometer that is comprised in the driving shaft of the conveyor system and that rotates with the driving shaft and triggers displacement pulses for pre-fixed distances, e.g. every 1 mm or every 5 mm, where for each pulse the weight related signals of the item(s) is registered and stored in the memory of the computer system 1404. Accordingly, tens of hundreds of weight related signals are collected while the item(s) are conveyed over the weighing platform 400 and generate the above mentioned weight-sensitivity-curve as discussed e.g. in relation to FIG. 4.

In one embodiment, in case of weighing a single item, the weight of the item is subsequently calculated by integrating over the weight-sensitivity-curve shown in FIG. 4 (the weigh measuring data) from t1 to t2 where the item leaves the second weighing section 303, where subsequently the result of the integration is converted to an actual weight $m_o$.

Based on the above, the weighing system 1400 may, due to the improved quality in the weighing data, irrespective of whether the weighing system is used as a dynamic weighing system or a flow scale, utilize integration calculation for determining the actual weight $m_o$ of the item(s) being conveyed over the weighing platform.

The weighing system including said platform is among other things capable of weighing heavy pieces of e.g. 10 kg with good result, but such heavy pieces tend to deform prior art platforms using standard single point load cells. However, since the weighing platform according to the present invention is e.g. hinged or supported as discussed in relation to the previous figures it does not deform and thus provides more consistent results.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A weighing platform adapted to be used in a weighing system for dynamically weighing a flow of items, the weighing platform comprising:
    at least one load sensor,
    at least two flat weighing sections adapted to be placed on said at least one load sensor,
    a first support for connecting or supporting said at least two flat weighing sections such that adjacent ends of said at least two flat weighing sections are aligned within the same plane such that said two flat weighing sections form a 2-dimensional planar surface, and
    a second support for maintaining distal ends of said at least two flat weighing sections, when connected or supported via said first support, at fixed height so as to create a zero weighing sensitivity at said distal ends.

2. A weighing platform according to claim 1, wherein said at least two flat weighing sections comprise multiple of elongated beams arranged parallel to the conveying direction of said items.

3. A weighing platform according to claim 1, wherein said at least two flat weighing sections comprise multiple of elongated beams arranged parallel to the conveying direction of said items, wherein at said adjacent ends of the at least two flat weighing sections the ends of the beams interleave or interlace at least partly.

4. A weighing platform according to claim 1, further comprising an additional flat in-feed and/or flat out-feed section with zero weighing sensitivity acting as an extension to one of said distal ends of said at least two flat weighing sections, the additional flat in-feed and/or flat out-feed section being connected or supported by said second support in a way that the additional in-feed and/or out-feed section is aligned within the same two-dimensional plane as said at least two flat weighing sections.

5. A weighing platform according to claim 1, wherein said first support is a supporting plate structure extending across the weighing platform, where the adjacent ends of said at least two flat weighing sections rest on the upper end of said supporting plate structure.

6. A weighing platform according to claim 5, wherein the lower end of said supporting plate structure rests on said at least one load sensor.

7. A weighing platform according to claim 3, wherein said first support comprises an elongated rod that extends through said portions of the elongated beams that interleave or interlace at least partly and mounts the adjacent at least two flat weighing sections together in a hinge like manner.

8. A weighing platform according to claim 1, wherein the weighing platform comprises two flat weighing sections and where said at least one load sensor is positioned under said first support.

9. A weighing platform according to claim 1, wherein the weighing platform comprises three or more flat weighing sections.

10. A weighing system comprising a weighing platform according to claim 1, comprising:
    a closed loop conveyor belt extending over said weighing platform,
    a driving motor for driving said conveyor belt,
    a displacement registration mechanism for registering the displacement of the items while being conveyed over the weighing platform, and
    a computer system operable connected to said displacement registration mechanism and said weighing platform for registering weight related signals from the at least one load sensor for different positions of said items on the weighing platform and calculating the weight of the items based on said weight related signals for said different positions.

11. A weighing system according to claim 10, wherein said conveyor belt is a modular belt system made of multiple of module units internally connected via hinge system.

12. A weighing system according to claim 10, wherein calculating the weight of the items based on said weight related signals is based on applying integral calculation by integrating over the measuring period where the items enter the weighing platform until when the items leave the weighing platform.

13. A weighing system according to claim 10, wherein the weighing system is a dynamic weighing system adapted for weighing one item at a time.

14. A weighing system according to claim 10, wherein the weighing system is a dynamic weighing system adapted for weighing a continuous flow of items.

15. A weighting platform adapted to be used in a weighing system for dynamically weighing a flow of items, the weighting platform comprising:
    at least one load sensor;
    at least two flat weighing sections adapted to be placed on said at least one load sensor;
    a first support for connecting or supporting said at least two flat weighing sections such that adjacent ends of said at least two flat weighing sections are aligned within the same plane such that said two flat weighing sections form a 2-dimensional planar surface; and
    a second support for maintaining distal ends of said at least two flat weighing sections, when connected or supported via said first support, at fixed height so as to create a zero weighing sensitivity at said distal ends; and
    wherein said at least two flat weighing sections comprise a multiple of elongated beams arranged parallel to the conveying direction of said items.

* * * * *